United States Patent
Ka et al.

(10) Patent No.: US 9,793,528 B2
(45) Date of Patent: Oct. 17, 2017

(54) SEPARATOR WITH IMPROVED THERMAL STABILITY AND SECONDARY BATTERY COMPRISING THE SAME

(71) Applicant: LG CHEM, LTD., Seoul (KR)

(72) Inventors: Kyung-Ryun Ka, Daejeon (KR); Joo-Sung Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 180 days.

(21) Appl. No.: 14/435,625

(22) PCT Filed: Sep. 17, 2014

(86) PCT No.: PCT/KR2014/008671
§ 371 (c)(1),
(2) Date: Apr. 14, 2015

(87) PCT Pub. No.: WO2015/041472
PCT Pub. Date: Mar. 26, 2015

(65) Prior Publication Data
US 2015/0243952 A1    Aug. 27, 2015

(30) Foreign Application Priority Data

Sep. 17, 2013  (KR) .................. 10-2013-0112013
Sep. 17, 2014  (KR) .................. 10-2014-0123674

(51) Int. Cl.
*H01M 2/16*  (2006.01)
*H01M 2/14*  (2006.01)
(Continued)

(52) U.S. Cl.
CPC ......... *H01M 2/1686* (2013.01); *H01M 2/164* (2013.01); *H01M 2/166* (2013.01);
(Continued)

(58) Field of Classification Search
CPC ......... H01M 10/0525; H01M 2220/30; H01M 2/14; H01M 2/145; H01M 2/164; H01M 2/1686

See application file for complete search history.

(56) References Cited

U.S. PATENT DOCUMENTS 4,075,400 A * 2/1978 Fritts ................ H01M 10/4235
                                                        429/62
6,432,586 B1 * 8/2002 Zhang ................... H01M 2/164
                                                       429/231.95
(Continued)

FOREIGN PATENT DOCUMENTS

JP    EP 0814531 A2 * 12/1997 .......... H01M 2/1686
JP    2012-527735 A    11/2012
(Continued)

OTHER PUBLICATIONS

Sigma-Aldrich. Product Data Sheet for Poly(3-hexylthiophene-2,5-diyl), 2017.*
(Continued)

*Primary Examiner* — Carlos Barcena
(74) *Attorney, Agent, or Firm* — Birch, Stewart, Kolasch & Birch, LLP

(57) ABSTRACT

A separator having a microcapsule including a core-shell layer-spacer layer with improved thermal stability and methods for releasing the thermal stabilizer loaded microcapsule on the overheating of a battery using the same are achieved.

13 Claims, 1 Drawing Sheet

(51) Int. Cl.
*H01M 10/0525* (2010.01)
*H01M 10/052* (2010.01)

(52) U.S. Cl.
CPC ..... *H01M 2/1653* (2013.01); *H01M 10/0525* (2013.01); *H01M 2/145* (2013.01); *H01M 10/052* (2013.01); *H01M 2220/30* (2013.01)

(56) References Cited

U.S. PATENT DOCUMENTS

| | | | | |
|---|---|---|---|---|
| 2003/0157413 | A1* | 8/2003 | Chen | H01M 10/052 429/326 |
| 2007/0015048 | A1 | 1/2007 | Lee et al. | |
| 2010/0297502 | A1 | 11/2010 | Zhu et al. | |
| 2012/0107667 | A1 | 5/2012 | Jeong et al. | |
| 2012/0135281 | A1* | 5/2012 | Choi | H01M 2/16 429/62 |
| 2013/0143076 | A1* | 6/2013 | Sachdev | H01G 11/52 429/50 |
| 2013/0171484 | A1* | 7/2013 | Baginska | H01M 10/056 429/62 |
| 2014/0120402 | A1 | 5/2014 | Yu et al. | |

FOREIGN PATENT DOCUMENTS

| | | |
|---|---|---|
| KR | 10-2007-0090852 A | 9/2007 |
| KR | 10-2009-0008085 A | 1/2009 |
| KR | 10-1173867 B1 | 8/2012 |
| KR | 10-2013-0021209 A | 3/2013 |
| KR | 10-2013-0022395 A | 3/2013 |
| WO | WO 2007/008006 A1 | 1/2007 |

OTHER PUBLICATIONS

International Search Report, issued in PCT/KR2014/008671, dated Dec. 19, 2014.
Written Opinion of the International Searching Authority, issued in PCT/KR2014/008671, dated Dec. 19, 2014.

* cited by examiner

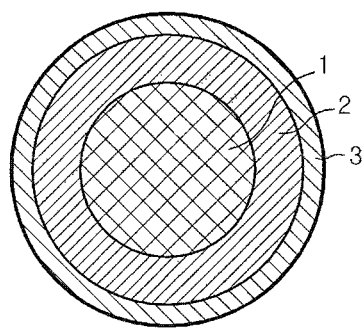

SEPARATOR WITH IMPROVED THERMAL STABILITY AND SECONDARY BATTERY COMPRISING THE SAME

TECHNICAL FIELD

This application claims priorities to Korean Patent Application No. 10-2013-0112013 filed in the Republic of Korea on Sep. 17, 2013 and Korean Patent Application No. 10-2014-0123674 filed in the Republic of Korea on Sep. 17, 2014, which are incorporated herein by reference.

The present disclosure relates to a separator with improved thermal stability and a secondary battery comprising the separator.

BACKGROUND ART

With the increase in the development and use of mobile devices, the importance of secondary batteries as a main power source is recently growing. Among the secondary batteries, particularly lithium secondary batteries have been commercially available and widely used due to their high energy density and high voltage.

Many companies have produced a variety of electrochemical devices with different safety characteristics. It is very important to evaluate and ensure the safety of the batteries. The most important consideration for safety is that operational failure or malfunction of batteries should not cause injury to users. For this purpose, regulatory guidelines strictly restrict potential dangers (such as fire and smoke emission) of electrochemical devices. Moreover, the most urgent problem to be solved is overcharging.

All batteries are dangerous when being overcharged and lithium ion secondary batteries have no exception. Particularly, the 'high-temperature overcharging' of the batteries is the most dangerous. Generally, when the lithium ion secondary batteries are overcharged to 4.2V or higher, decomposition of an electrolyte solution starts and there is a high possibility of ignition when the lithium ion secondary battery reaches a high temperature of flash point.

In order to overcome this problem, various attempts have been proposed, but there is a still need for more effective solutions.

DISCLOSURE

Technical Problem

The present disclosure is designed to solve the above-mentioned problems, and therefore one aspect of the present disclosure is directed to providing a separator comprising microcapsules which can release a thermal stabilizer only under the condition of above a certain temperature and/or a certain pressure, a method of preparing the separator, and a secondary battery comprising the separator.

Thereby, the separator according to the present disclosure does not have a problem that the thermal stabilizer-loaded microcapsules prematurely rupture during a process of the lamination of an electrode assembly and that the desired effect on the overheating of a secondary battery cannot be achieved.

Also, another aspect of the present disclosure is directed to providing a separator in which thermal stabilizer-loaded microcapsules are disposed so as to effectively function at the time of the overheating of a secondary battery, thereby improving the thermal stability of the secondary battery, a method of preparing the separator, and a secondary battery comprising the separator.

Technical Solution

In order to solve the above-mentioned technical problem, in accordance with one aspect of the present disclosure, there is provided a separator comprising: a porous substrate; and a microcapsule-containing layer coated on at least one surface of the porous substrate, wherein the microcapsule consists of a core having a thermal stabilizer, a shell layer surrounding the core, and a spacer layer surrounding the shell layer.

The spacer layer is soften by the impregnation of an electrolyte solution and ruptures at a temperature higher than 200° C. or a pressure higher than 50 kg/cm$^2$.

The shell layer ruptures at a temperature of 70 to 100° C. or a pressure of 3 to 10 kg/cm$^2$.

The separator may further comprise a porous coating layer between the porous substrate and the microcapsule-containing layer, the porous coating layer comprising a mixture of organic particles or inorganic particles and a binder polymer.

The microcapsule-containing layer may further comprise a mixture of organic particles or inorganic particles and a binder polymer.

The thermal stabilizer may be any one selected from the group consisting of a phosphate compound, a phenolic compound, a cyclic amine compound, semicarbazide, an amine compound, a nitro compound, a phosphite compound, an unsaturated hydrocarbon compound, a thio-based compound, and a mixture thereof.

The thermal stabilizer may be triphenyl phosphate.

The shell may be made of any one selected from the group consisting of polyolefin, polyvinyl alcohol (PVA), polyvinyl chloride (PVC), and a mixture thereof.

The spacer may be made of any one selected from the group consisting of polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinylacetate, polyethylene-co-vinyl acetate, polyethylene oxide, polyacrylic acid, polyvinyl alcohol, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof.

In accordance with another aspect of the present disclosure, there is provided a method of preparing a separator, comprising dispersing the above-mentioned microcapsule in an organic solvent to form a dispersion, and applying the dispersion on a porous substrate.

Also, the present disclosure provides a method of preparing a separator, comprising dispersing the above-mentioned microcapsule, inorganic particles or organic particles, and a binder polymer in an organic solvent to form a slurry, and applying the slurry on a porous substrate.

In addition, the present disclosure provides a method of preparing a separator, comprising dispersing inorganic particles or organic particles, and a binder polymer in an organic solvent to form a slurry, applying the slurry on a porous substrate, and further applying a dispersion obtained by dispersing the above-mentioned microcapsule in an organic solvent before or after the slurry is dried.

In accordance with still another aspect of the present disclosure, there is provided a secondary battery, comprising a cathode, an anode, a separator interposed between the cathode and the anode, and an electrolyte solution, wherein the separator is the above-mentioned separator.

In the present disclosure, the thermal stabilizer may be present in an amount of 0.01 to 1 wt % based on the total weight of the electrolyte solution.

The electrochemical device may be a lithium secondary battery.

Advantageous Effects

When a secondary battery is manufactured using the separator of the present disclosure, the microcapsules applied in the separator can be preserved intact without premature rupture even after a process of laminating electrode assembly. As a result, a thermal stabilizer loaded in the microcapsules can be released to inhibit the ignition of the secondary battery when the secondary battery overheats, thereby minimizing damage due to the ignition or explosion of the secondary battery.

Also, the separator of the present disclosure is characterized in that the thermal stabilizer-loaded microcapsules are disposed where the thermal stabilizing effect can be most effectively achieved when the secondary battery overheats.

DESCRIPTION OF DRAWINGS

FIG. 1 schematically shows a microcapsule consisting of core-shell layer-spacer layer, according to the present disclosure.

BEST MODE

Hereinafter, the present disclosure will be described in detail with reference to the drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The separator of the present disclosure comprises microcapsules loading a thermal stabilizer and having the structure consisting of core-shell layer-spacer layer.

Referring to FIG. 1, the microcapsule is formed by a core 1, a shell layer 2 surrounding the core 1, and a spacer layer 3 surrounding the shell layer 2 wherein the core 1 loads a thermal stabilizer. Such a microcapsule releases the thermal stabilizer by the rupture of the spacer layer and/or the shell layer when a secondary battery using the microcapsule overheats.

As used herein, the term 'rupture' refers to any phenomenon that internal components such as a thermal stabilizer can be released as well as the phenomenon that the spacer layer and/or the shell layer are destroyed, and non-limiting examples of such any phenomenon may include swelling, melting, fracture, and cracking, but are not limited thereto.

As used herein, the term 'spacer' layer refers to a layer which is disposed at the outermost microcapsule and surrounds the shell layer.

The spacer layer is a component for protecting the shell layer rupturing during a process of the lamination of an electrode assembly. As a result, it can prevent the thermal stabilizer from being prematurely released before the battery overheats. If the thermal stabilizer is accidently prematurely released or if the battery is intentionally designed in order for the thermal stabilizer to be released before the battery overheats, it is unfavorable since the prematurely released thermal stabilizer adversely affects the performances of the battery.

The spacer layer may be formed from a material that should withstand a temperature higher than 200° C. and a pressure higher than 50 kg/cm$^2$ and have rigidity in its dried state, but such rigidity should disappear or decrease after the spacer layer is impregnated with an electrolyte solution. Alternatively, the spacer layer may be formed from a material that should withstand a temperature higher than 250° C. and a pressure higher than 70 kg/cm$^2$ and have rigidity in its dried state, but such rigidity should disappear or decrease after the spacer layer is impregnated with an electrolyte solution.

If the spacer layer is absent or ruptures at a temperature and/or a pressure below such numeral range, the space layer ruptures during a process of the lamination of an electrode assembly and the thermal stabilizer is prematurely released before the desired time.

Also, if the spacer layer is formed from a material that maintains rigidity even after being impregnated with an electrolyte solution, it is unfavorable because the microcapsule would take too long to show effects in a situation of the thermal abuse state of the battery. Accordingly, the spacer layer should be soften by the impregnation of an electrolyte solution to lose a rigidity or have a reduced rigidity.

The spacer layer may be made of various polymers which are insoluble in an electrolyte; are inert in the internal environment of the battery; and are capable of melting or rupturing under the above-mentioned conditions. Non-limiting examples of such polymers may include polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinylacetate, polyethylene-co-vinyl acetate, polyethylene oxide, polyacrylic acid, polyvinyl alcohol, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof, but are not limited thereto.

In one embodiment of the present disclosure, the spacer layer may have a thickness of 20 to 100 nm. If the thickness of the spacer layer is below than the lower limit, it fails to maintain the structure of core-shell layer-spacer layer at the temperature and pressure during a process of lamination. If the thickness of the spacer layer is above than the upper limit, softening of the spacer may be retarded although it is impregnated with the electrolyte solution. Considering this matter, the thickness of the spacer layer is important in the present disclosure since the thermal stabilizer should be released on the thermal abuse of the battery.

As used herein, the term 'shell' layer refers to a component which is present between the spacer layer and the core and surrounds the core.

The shell layer can be kept intact by virtue of the spacer layer during a process of the lamination of an electrode assembly. When the spacer layer is softened by the impregnation of an electrolyte solution and the battery is subject to an expansion of volume expansion and an increase of internal pressure because of its thermal abuse, the shell layer ruptures to release the thermal stabilizer loaded in the microcapsule. For this procedure, the shell layer should melt or decompose at a temperature of 70 to 100° C. or should rupture at a pressure of 3 to 10 kg/cm$^2$. If the shell layer is designed to rupture at a temperature or pressure below such numerical range, the thermal stabilizer is unnecessarily prematurely released, resulting in adversely affecting the performances of the battery. If the shell layer ruptures at a temperature or pressure above such numerical range, the thermal stabilizer fails to be released even when the the battery overheats and the desired effect cannot be achieved.

The shell layer may be made of various polymers which are insoluble in an electrolyte; are inert in the internal environment of the battery; and capable of melting or rupturing under the above-mentioned conditions. Non-limiting examples of such polymers may include polyolefin such as polyethylene, polypropylene; polyvinyl alcohol (PVA); polyvinyl chloride (PVC); and a mixture thereof.

In one embodiment of the present disclosure, the shell layer may have a thickness of 20 to 100 nm. If the thickness of the shell layer is too thick or too thin, the shell layer fails to rupture at the desired temperature and pressure.

In the battery prepared finally, the shell layer ruptures when the battery is subject to volume expansion due to a thermal abuse and, therefore, each of the temperature or pressure of the battery raises higher than the above-mentioned numerical range of each of temperature or pressure.

The specific conditions that the shell layer and/or the spacer layer rupture at may be controlled by the properties or molecular size of the raw materials themselves, and in some cases, by the preparation method.

The thermal stabilizer being used as a core material refers to a component which is capable of capturing unstable free radicals formed when the battery is exposed at a high temperature in its charging or discharging processes, and it is preferred that the thermal stabilizer does not elutes into an electrolyte solution. Thereby, deterioration of the binder polymer or polymer components used in the porous coating layer, separator or the battery by free radicals resulting from oxidation or conversion into polyene (resulting in dissociation) can be prevented. Further, the deterioration of battery performances resulted therefrom can be prevented.

The thermal stabilizer may be contained in a porous coating layer in the form of aggregates being obtained by physical aggregation.

In one embodiment of the present disclosure, the aggregates of the thermal stabilizer may be in a form of secondary particles which are obtained by physical aggregation of primary particles having a relatively small diameter. Such aggregates may be particulated into primary particles in a process of heating and/or compression and broadly dispersed in the porous coating layer.

In another embodiment of the present disclosure, the aggregates may be obtained by bonding the thermal stabilizer having a relatively small diameter by a certain binder polymer which may be the same as or different from the binder polymer component used in the porous coating layer.

Non-limiting examples of the thermal stabilizer may include a phosphate compound, a phenolic compound, a cyclic amine compound, semicarbazide, an amine compound, a nitro compound, a phosphite compound, an unsaturated hydrocarbon compound, a thio-based compound, and a mixture thereof.

Preferably, the phosphate compound is triphenyl phosphate. The triphenyl phosphate can be effectively used in inhibiting battery ignition but the excessive use thereof may adversely affect battery performances. Accordingly, it is particularly preferred that the triphenyl phosphate is used in the form of a microcapsule in the separator of the present disclosure.

Preferred examples of the phenolic thermal stabilizer may include 2,2-di(4'-hydroxyphenyl) propane, hydroquinone, methoxyphenol, t-butylhydroxy-anisol, n-octadecyl-3-(4-hydroxy-3,5-di-t-butylphenyl)propionate, pentaerithritol tetrakis-[3-(3,5-di-t-butyl-4-hydroxyphenyl)propionate], 1,2-propylene glycol bis-[3-(3,5-di-t-butyl-4-hydroxyphenyl) propionate], stearamido N,N-bis-[ethylene 3-(3,5-di-t-butyl-4-hydroxyphenyl)propionate], 2,5-di-t-butylhydroquinone, 4,4'-butylidenebis(3-methyl-6-t-butylphenol), 3,5-di-t-butyl-4-hydroxytoluene, 2,2'-methylene-bis(4-ethyl-6-t-butylphenol), triethyleneglycol-bis-[3-(3-t-butyl-5-methyl-4-hydroxyphenyl)propionate], pentaerithritoltetrakis[3-(3,5-di-t-butyl-4-hydroxy-phenyl) propionate], 2,6-di-t-butyl-4-methylphenol, t-butylcatechol, 4,4-thiobis(6-t-butyl-m-cresol), tocopherol, nordihydroguaiaretic acid, but are not limited thereto.

Examples of the cyclic amine-based thermal stabilizer may include phenylnaphthylamine, N,N'-diphenyl-p-phenylenediamine, and 4,4'-bis(dimethylbenzyl)diphenylamine, and examples of the semicarbazide-based thermal stabilizer may include hydrofluoride, hydrochloride, nitrate, acid sulfate, sulfate, chlorate, formate, acid oxalate, acid maleate and semicarbazide maleate; semicarbazide derivatives, e.g., 1-acetylsemicarbazide, 1-chloroacetylsemicarbazide, 1-dichloroacetyl-semicarbazide, 1-benzoylsemicarbazide, and semicarbazone.

Examples of the amine-based thermal stabilizer may include carbohydrazide, thiosemicarbazide, thiosemicarbazone derivatives, thiocarbazide and thiocarbazide derivatives, and examples of the nitro-based thermal stabilizer may include nitroanisol, nitrosodiphenylamine, nitroaniline, and aluminum salt of N-nitrosophenylhydroxylamine.

Examples of the unsaturated hydrocarbon-based thermal stabilizer may include, but are not particularly limited to, styrene, 1,3-hexadiene and methyl styrene, and examples of the thio-based thermal stabilizer may include dilauryl thiodipropionate, dimyristylthiopropionate, distearylthiodipropionate, dodecyl mercaptan and 1,3-diphenyl-2-thiourea.

Examples of the phosphite-based thermal stabilizer may include triphenyl phosphite, diphenylisodecyl phosphite, phenyldiisodecyl phosphite, 4,4'-butylidene-bis(3-methyl-6-t-butylphenyl-di-tridecyl)phosphate, cyclic neopentanetetrayl-bis(octadecyl)phosphite, tris(nonylphenyl)phosphite and tris(dinonyl)phosphite, dioctadecyl-3,5-di-t-butyl-4-hydroxybenzylphosphonate, and di-n-octadecyl-1-(3,5-di-t-butyl-4-hydroxy-phenyl)-ethanephosphonate, but are not limited thereto.

In one embodiment of the present disclosure, the core may have a diameter of 10 to 800 nm. If the diameter of the core is above such numerical range, the thickness of the layer containing the microcapsules increases by the microcapsule size, and the resistance of the separator also increases. If the diameter of the core is below such numerical range, the loading amount of the thermal stabilizer is not sufficient, making it difficult to obtain the desired effect.

The thermal stabilizer is preferably present in an amount of 0.01 to 1 wt % based on the total weight of the non-aqueous electrolyte solution. If the amount of the thermal stabilizer is too small, it is difficult to obtain the desired effect. If the amount of the thermal stabilizer is too excessive, it is also unpreferable since it may absorb an excessive amount of the electrolyte and be swollen to weaken the adhesiveness between the electrodes and the separator, and may cause various side reactions in the battery.

The microcapsule preferably has a diameter of about 1 to 50 μm. Considering the uniform distribution of the thermal stabilizer, it is favorable that the microcapsule has a small diameter to have a large surface area per unit weight. However, if the microcapsule particle having a diameter smaller than the lower limit, it is difficult to prepare such microcapsule and it is difficult for the spacer layer or the shell layer to rupture when the battery overheats. Also, if the microcapsule has a diameter larger than the upper limit, the microcapsule may rupture too easily by compression.

According to one embodiment of the present disclosure, the microcapsule may be applied on at least one surface of the porous substrate in the separator.

Also, according to another embodiment of the present disclosure, the microcapsule may be incorporated in a porous coating layer which may be formed on the porous substrate.

In addition, according to still another embodiment of the present disclosure, the microcapsule may be present on the surface of the porous coating layer.

When the thermal stabilizer is disposed adjacent to the position of heat occurrence, the release of the thermal stabilizer can rapidly initiate on the thermal abuse of the battery. Therefore, the microcapsules containing the thermal stabilizer are preferably disposed adjacent to electrodes.

In the porous coating layer formed from a mixture of inorganic particles and a binder polymer, the inorganic particles are not particularly limited if they are electrochemically stable.

That is, the inorganic particles which may be used in the present disclosure are not particularly limited unless an oxidation-reduction reaction occurs in an operating voltage range (for example, 0 to 5 V based on Li/Li$^+$) of an applied electrochemical device. Particularly, inorganic particles having a high dielectric constant can increase the dissociation rate of an electrolyte salt, such as a lithium salt, in a liquid electrolyte, thereby improving an ionic conductivity of the electrolyte solution.

For these reasons, it is preferred that the inorganic particles comprise inorganic particles having a dielectric constant of 5 or higher, preferably 10 or higher. Examples of the inorganic particles having a dielectric constant of 5 or higher include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$ inorganic particles, and they may be used alone or as a mixture of two or more thereof.

Also, the inorganic particles may be those having the ability to transport lithium ions, i.e., inorganic particles containing lithium atom which are capable of moving lithium ions without storing the lithium. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, and a mixture thereof.

The inorganic particles are not limited to their size, but may have an average diameter of 0.001 to 10 μm so as to form the coating layer in a uniform thickness and obtain a suitable porosity. If the diameter is smaller than 0.001 μm, dispersibility may be lowered. If the diameter is larger than 10 μm, the thickness of the coating layer may increase.

Also, the weight ratio of the inorganic particles and the binder polymer may be in the range of 50:50 to 99:1, preferably 70:30 to 95:5. If the weight ratio of the inorganic particles and the binder polymer is less than 50:50, the amount of the binder polymer becomes excessive, making it decrease the pore size and porosity of the coating layer being formed. If the amount of the inorganic particles exceeds 99 parts by weight, the amount of the binder polymer becomes small, making it weaken the anti-peeling property of the coating layer being formed.

The microcapsule may be prepared by various methods for producing a capsule loading a thermal stabilizer therein, without any particular limitation. For example, phase change materials are dispersed in an aqueous solution through emulsification, and polymerization is carried out on the surface of the oil phase of the phase change materials to produce a shell. The polymerization may be made by way of interfacial polymerization, in-situ polymerization, or coacervation. Then, polymerization is carried out on the surface of the shell to form a spacer layer, in which the polymerization is made according to a polymerizing method conventionally known in the art, without any particular limitation.

The microcapsules loading a thermal stabilizer therein may be dispersed in a dispersion and applied on at least one surface of a porous substrate, or in the case that a porous coating layer is formed on the porous substrate, the microcapsules may be contained in a slurry for the porous coating layer and applied on the porous substrate, or the microcapsules may be applied in the form of a dispersion on the surface of the porous coating layer.

The porous substrate of the separator may be any one of various planar porous polymer substrates being used in electrochemical devices, e.g., a thin insulating film having high ion permeability, good mechanical strength, a pore diameter of 0.01 to 10 μm, and a thickness of 5 to 300 μm. For example, porous polymer films made of polyolefin-based polymers such as ethylene homopolymer, propylene homopolymer, ethylene/butene copolymer, ethylene/hexene copolymer and ethylene/methacrylate copolymer may be used alone or in the form of lamination. Also, conventional porous non-woven fabrics such as a non-woven fabric made of glass fiber having a high melt point or polyethylene terephthalate fiber may be used, but is not limited thereto.

One aspect of the present disclosure provides a method of preparing a separator in which the microcapsules are applied.

The thermal stabilizer is loaded in the microcapsules and applied in the separator.

For this, the microcapsules loading the thermal stabilizer are dispersed in an organic solvent, such as N-methyl-2-pyrrolidone (NMP), N,N-dimethylformamide, tetrahydrofuran, dimethylacetamide, dimethyl sulfoxide, hexamethyl sulfonamide, tetramethylurea, acetone, methyl ethyl ketone, and a mixture thereof, to obtain a dispersion, and the dispersion is applied on the porous substrate. Since the spacer layer of the microcapsules has adhesiveness, the dispersion of the microcapsules in an organic solvent can be applied on at least one surface of the porous substrate or on the porous coating layer, without adding a binder polymer. If necessary, a binder polymer may be additionally used.

Also, in order to prepare a separator in which a porous coating layer comprising inorganic particles or organic particles and a binder polymer is formed on at least one surface of a porous substrate, the microcapsules loading a thermal stabilizer may be incorporated in a slurry for the porous coating layer and the slurry is applied on at least one surface of the porous substrate, or immediately after a slurry for the porous coating layer is applied on at least one surface of a porous substrate or after the slurry is applied and dried, a dispersion containing the microcapsules may be applied thereon.

The slurry for the porous coating layer in which inorganic particles are dispersed and a binder polymer is dissolved in a solvent may be obtained by dissolving the binder polymer in the solvent and adding the inorganic particles thereto and dispersing them therein. The inorganic particles may be pulverized into a proper size prior to addition, but it is preferred that the inorganic particles are pulverized by way of ball-milling and dispersed after being added to the solution of binder polymer.

A method of applying the dispersion or the slurry is not particularly limited and various coating methods being conventionally known in the art, for example, dip coating die coating, roll coating, comma coating, or a combination thereof may be used.

Subsequently, the dispersion or the slurry is dried to obtain a separator.

One aspect of the present disclosure provides a secondary battery comprising the separator in which the microcapsules are applied.

The secondary battery may be prepared by interposing the separator between a cathode and an anode to obtain an electrode assembly of the cathode, the anode and the separator, the electrode assembly is subject to folding, winding or lamination in the desired form and put in a battery case, and an electrolyte solution is introduced in the case.

Electrodes of the cathode and anode may be prepared by mixing an electrode active material, a binder polymer, and optionally a conductive material and a filler to obtain an electrode slurry and coating the slurry on a current collector. For example, the slurry may be coated on a current collector such as a metallic foil, followed by drying, pressing, thereby obtaining each electrode.

The cathode is prepared by applying a mixture of a cathode active material, a conductive material and a binder polymer on a cathode current collector, followed by drying. If necessary, the cathode may further comprise a filler.

The cathode current collector generally has a thickness of 3 to 500 μm. Such a cathode current collector is not particularly limited if it has high conductivity without causing any chemical change in the battery. Examples of the cathode current collector include stainless steel, aluminum, nickel, titanium, sintered carbon; or aluminum or stainless steel treated with carbon, nickel, titanium or silver on the surface thereof. Also, the current collector may have fine protruding parts on the surface thereof so as to increase adhesion with the cathode active material and may be in the various forms of a film, a sheet, a foil, a net, a porous structure, a foam, a non-woven fabric.

Examples of the cathode active material may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides of $LiNi_{1-x}M_xO_2$ (M=Co, Mn, Al, Cu, Fe, Mg, B or Ga, and $0.01 \leq x \leq 0.3$); lithium manganese composite oxides of $LiMn_{2-x}M_xO_2$ (M=Co, Ni, Fe, Cr, Zn or Ta, and $0.01 \leq x \leq 0.1$) or $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The conductive material is conventionally added in an amount of 1 to 50 wt %, based on the total weight of the mixture containing the cathode active material. Such a conductive material is not particularly limited if it has conductivity without causing any chemical change in the battery. Examples of the conductive material may include graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive oxides such as titanium oxide; and polyphenylene derivatives. In some cases, the addition of the conductive material may be omitted when the cathode active material has a second conductive coating layer thereon.

The binder polymer is a component assisting in binding the active material and conductive material, and in binding them to the current collector. The binder polymer is conventionally added in an amount of 1 to 50 wt %, based on the total weight of the mixture containing the cathode active material. Examples of the binder polymer may include polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylenepropylene-diene terpolymer (EPDM), sulfonated EPDM, styrene-butadiene rubber, fluorinated rubber and other various copolymers.

The filler is an optional ingredient used to inhibit the expansion of the cathode. Such a filler is not particularly limited if it is a fibrous material without causing any chemical change in the battery. Examples of the filler may include olefin polymers such as polyethylene and polypropylene; and fibrous materials such as glass fiber and carbon fiber.

The anode is prepared by applying an anode material on an anode current collector, followed by drying. If necessary, the anode may further comprise other components as described above.

The anode current collector generally has a thickness of 3 to 500 μm. Such an anode current collector is not particularly limited if it has conductivity without causing any chemical change in the battery. Examples of the anode current collector include copper, stainless steel, aluminum, nickel, titanium, sintered carbon; copper or stainless steel treated with carbon, nickel, titanium or silver on the surface thereof; and aluminum-cadmium alloys. Similar to the cathode current collector, the anode current collector may have fine protruding parts on the surface thereof so as to increase adhesion with the anode active material and may be in the various forms of a film, a sheet, a foil, a net, a porous structure, a foam, a non-woven fabric.

Examples of the anode material may include carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, Group I, Group II and Group III elements of the Periodic Table of the Elements, halogen atoms; $0 < x \leq 1$; $1 \leq y \leq 3$; and $1 \leq z \leq 8$); metallic lithium; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, conductive polymers such as polyacetylene; and Li—Co—Ni-based materials.

Further, the present disclosure provides a lithium secondary battery, comprising a electrode assembly impregnated with a non-aqueous electrolyte solution containing a lithium salt.

The non-aqueous electrolyte solution comprises a non-aqueous solvent and a lithium salt.

Examples of the non-aqueous solvent may include aprotic organic solvents such as N-methyl-2-pyrollidinone, propylene carbonate, ethylene carbonate, butylene carbonate, dimethyl carbonate, diethyl carbonate, γ-butyro lactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material being dissolved in the above-mentioned non-aqueous solvent and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborane, lithium lower aliphatic carboxylate, lithium tetraphenyl borate and imide.

Additionally, in order to improve charge/discharge characteristics and flame retardancy, an additive such as pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be used in the non-aqueous electrolyte solution. If necessary, in order to impart incombustibility, the non-aqueous electrolyte solution may further comprise a halogen-containing solvent such as carbon tetrachloride and ethylene trifluoride. Further, in order to improve high-temperature storage characteristics, the non-aqueous electrolyte solution may additionally comprise carbon dioxide gas.

What is claimed is:

1. A separator, comprising:
    a porous substrate; and
    a microcapsule-containing layer coated on at least one surface of the porous substrate,
    wherein the microcapsule consists of a core having a thermal stabilizer, a shell layer surrounding the core, and a spacer layer surrounding the shell layer,
    wherein the spacer layer is softened by the impregnation of an electrolyte solution and ruptures at a temperature higher than 200° C. or a pressure higher than 50 $kg/cm^2$, and
    wherein the spacer layer is made of any one selected from the group consisting of polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinylacetate, polyethylene-co-vinyl acetate, polyethylene oxide, polyacrylic acid, polyvinyl alcohol, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof.

2. The separator according to claim 1, wherein the shell layer ruptures at a temperature of 70 to 100° C. or a pressure of 3 to 10 $kg/cm^2$.

3. The separator according to claim 1, wherein the separator further comprises a porous coating layer between the porous substrate and the microcapsule-containing layer, the porous coating layer comprising a mixture of organic particles or inorganic particles and a binder polymer.

4. The separator according to claim 1, wherein the microcapsule-containing layer further comprises a mixture of organic particles or inorganic particles and a binder polymer.

5. The separator according to claim 1, wherein the thermal stabilizer is any one selected from the group consisting of a phosphate compound, a phenolic compound, a cyclic amine compound, semicarbazide, an amine compound, a nitro compound, a phosphite compound, an unsaturated hydrocarbon compound, a thio-based compound, and a mixture thereof.

6. The separator according to claim 1, wherein the thermal stabilizer is triphenyl phosphate.

7. The separator according to claim 1, wherein the shell is made of any one selected from the group consisting of polyolefin, polyvinyl alcohol (PVA), polyvinyl chloride (PVC), and a mixture thereof.

8. A secondary battery, comprising a cathode, an anode, a separator interposed between the cathode and the anode, and an electrolyte solution,
    wherein the separator is one defined in claim 1.

9. The secondary battery according to claim 8, wherein the thermal stabilizer is present in an amount of 0.01 to 1 wt % based on the total weight of the electrolyte solution.

10. The secondary battery according to claim 9, wherein the electrochemical device is a lithium secondary battery.

11. A method of preparing a separator, comprising dispersing the microcapsule according to claim 1 in an organic solvent to form a dispersion, and applying the dispersion on a porous substrate.

12. A method of preparing a separator, comprising dispersing the microcapsule according to claim 1, inorganic particles or organic particles, and a binder polymer in an organic solvent to form a slurry, and applying the slurry on a porous substrate.

13. A method of preparing a separator, comprising dispersing inorganic particles or organic particles, and a binder polymer in an organic solvent to form a slurry, applying the slurry on a porous substrate, and further applying a dispersion obtained by dispersing the microcapsule according to claim 1 in an organic solvent before or after the slurry is dried.

* * * * *